(12) United States Patent
Wang et al.

(10) Patent No.: US 6,934,543 B2
(45) Date of Patent: Aug. 23, 2005

(54) METHOD AND APPARATUS FOR FILTERING INCOMING CALLS IN A MOBILE COMMUNICATION SYSTEM

(75) Inventors: Shu-shaw Wang, Arlington, TX (US); Federico Fraccaroli, Irving, TX (US)

(73) Assignee: Nokia, Inc., Irving, TX (US)

( * ) Notice: Subject to any disclaimer, the term of this patent is extended or adjusted under 35 U.S.C. 154(b) by 641 days.

(21) Appl. No.: 09/850,197

(22) Filed: May 8, 2001

(65) Prior Publication Data

US 2002/0168987 A1 Nov. 14, 2002

(51) Int. Cl.[7] .................................................. H04Q 7/20
(52) U.S. Cl. ..................... 455/433; 455/432.1; 455/566; 455/422.1
(58) Field of Search ............................ 455/446, 432.1, 455/422.1, 433, 456, 211, 199, 517

(56) References Cited

U.S. PATENT DOCUMENTS 5,818,920 A * 10/1998 Rignell et al. ......... 379/211.02
6,600,817 B1 * 7/2003 Shaffer et al. .............. 379/199
6,707,901 B1 * 3/2004 Hodges et al. ......... 379/221.09

* cited by examiner

Primary Examiner—Temica M. Beamer
(74) Attorney, Agent, or Firm—Banner & Witcoff, Ltd.

(57) ABSTRACT

A method and apparatus are provided for filtering incoming calls. A request for a call from a calling unit to a mobile subscriber unit is received and a check is performed to determine whether local time information indicates that the mobile subscriber unit is within a time zone in an inconvenient time period. An indication is sent to the calling unit to inform the calling unit that the mobile subscriber unit is in the time zone within the inconvenient time period when the checking of the local time information determines that the local time information is within the inconvenient period. Other aspects of the invention include displaying the mobile subscriber unit's local time on a display of the calling unit, displaying a message to the calling unit asking whether the call is an emergency, only allowing the call to be connected if it is an emergency when the call is made during an inconvenient time period, and generating a voice message to a calling unit when the calling unit attempts to make a call to a called mobile subscriber unit during an inconvenient time period.

29 Claims, 22 Drawing Sheets

Called party's local time is 3:00AM. Is this an emergency?

FIG. 4

P1402 — Receive Registration Information, Local Time and Inconvenient Time Information P1404 — Pass Registration Information, Local Time and Inconvenient Time Information to HLR Continue

FIG. 14

METHOD AND APPARATUS FOR FILTERING INCOMING CALLS IN A MOBILE COMMUNICATION SYSTEM

FIELD OF THE INVENTION

Aspects of the invention pertain to incoming call filtering in a communication network. In particular, aspects of the invention relate to a method and apparatus for filtering incoming calls in a communication network based on a local time of a called subscriber unit.

BACKGROUND OF THE INVENTION

A user of a calling mobile subscriber unit may call a user of a called mobile subscriber unit without knowing that the called mobile subscriber unit may be roaming and may be in a different time zone, such that allowing the call to be established would disturb the user of the called mobile subscriber unit because the call is occurring at an inconvenient time, such as for example, during the middle of the night.

There is a need for filtering incoming calls, such that mobile calls are not established during a time which is inconvenient for the called mobile subscriber user unless the call is, for example, an emergency call.

BRIEF SUMMARY OF THE INVENTION

A method and apparatus are provided for filtering incoming calls. In an embodiment of the invention, local time information of a mobile subscriber unit is recorded. A request for a call from a calling unit to the mobile subscriber unit is received and a check is performed to determine whether the local time information indicates that the mobile subscriber unit is within a time zone in an inconvenient time period. The call is prevented from being established when the local time information of the mobile subscriber unit is within the inconvenient period.

In another embodiment of the invention, local time information is received at a mobile subscriber unit and the mobile subscriber unit updates a local time based on the received local time information. A calling unit initiates a call to the mobile subscriber unit and the request for the call is received at the mobile subscriber unit. The mobile subscriber unit checks the local time and sends an indication to the calling unit indicating that the local time of the mobile subscriber unit is within the inconvenient time period when the local time of the mobile subscriber unit is within the inconvenient time period.

Embodiments of the invention perform incoming call filtering, such that an indication is sent to the calling unit when the calling unit is attempting to make a call to a mobile subscriber unit within a time zone in an inconvenient time period, such as, for example, during the middle of the night.

Other aspects of the invention include displaying the mobile subscriber unit's local time on a display of the calling unit, displaying a message to the calling unit asking whether the call is an emergency, only allowing the call to be connected if it is an emergency when the call is made during an inconvenient time period, and generating a voice message to a calling unit when the calling unit attempts to make a call to a called mobile subscriber unit during an inconvenient time period.

BRIEF DESCRIPTION OF THE DRAWINGS

FIG. 4 provides an example of a message being displayed on a display of a calling mobile subscriber unit, when the calling mobile subscriber unit attempts to make a call to a mobile subscriber unit in a time zone within an inconvenient time period;

FIG. 14 is a flow chart, which explains processing in the VLR in a first embodiment of the invention;

DETAILED DESCRIPTION OF THE INVENTION

Figure 1:
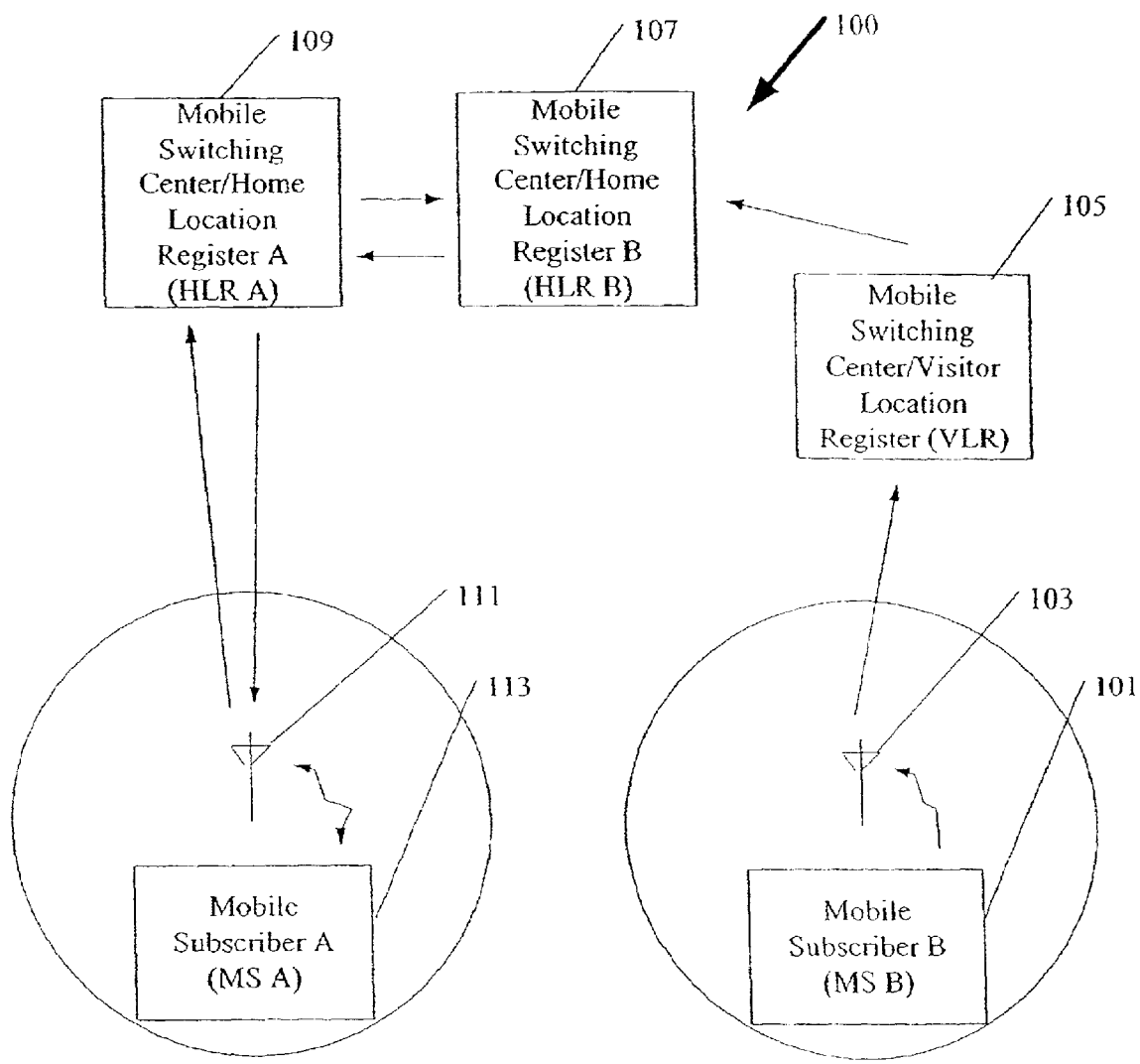
FIG. 1 illustrates a mobile communication system in which calls are filtered to a called mobile subscriber unit.

FIG. 1 shows an example of an embodiment 100 of the invention. In this embodiment, mobile subscriber unit (MS) B 101 registers with a Mobile Switching Center/Visitor Location Register (VLR) 105 via a base station 103. The registration allows the MS B to receive calls even though it is outside of its home calling area. VLR 105 sends the registration information and includes local time information regarding a time zone in which VLR 105 resides to mobile subscriber unit B's Mobile Switching Center/Home Location register (HLR), HLR B 107.

During an inconvenient time for mobile subscriber unit B 101, mobile subscriber unit (MS) A 113 attempts to establish a call with mobile subscriber unit B 101 via base station 111 and HLR A 109. HLR A 109 passes the call request to mobile subscriber unit B's HLR, HLR B 107, which sends an indication via HLR A 109 and base station 111 to mobile subscriber unit A 113 indicating that the call attempt is occurring during an inconvenient time for mobile subscriber unit B 101. Note that HLR A 109 and HLR B 107 may be the same HLR Further, mobile subscriber unit A 113 may also be a roaming mobile subscriber, in which case mobile subscriber unit A 113 would communicate with its HLR A 109 through a VLR.

Figure 2:
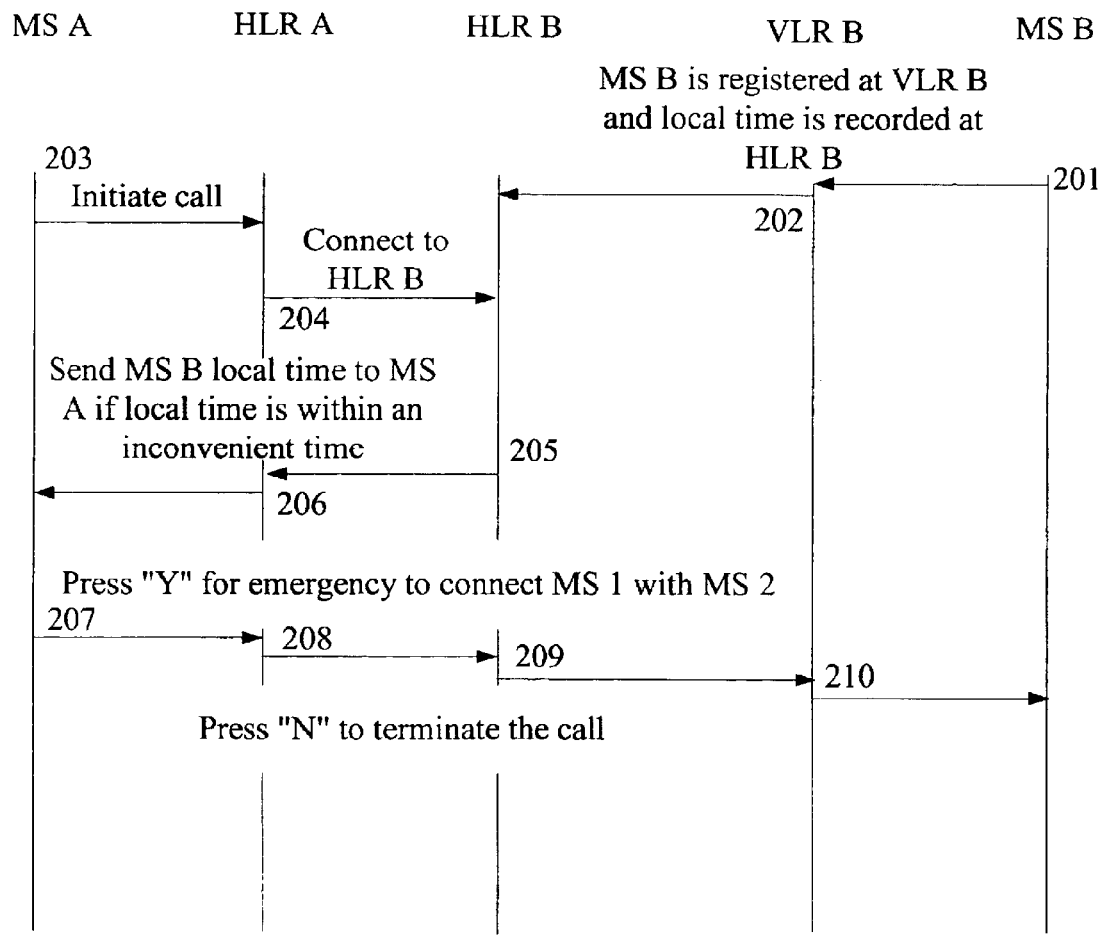
FIGS. 2 and 3 are sequence charts which explain incoming call filtering in a first embodiment of the invention.

FIG. 2 is a sequence chart, which illustrates an implementation of a first embodiment of the invention. At 201, roaming mobile subscriber unit B registers with VLR B. Also included with the registration information or in a separate message may be inconvenient time period information. The inconvenient time period information may be entered by a user of the mobile subscriber unit as a time range, such as, for example, 12:00AM to 8:00AM, or the user may select one or more of several preset time ranges, such as, for example, 12:00AM to 4:00AM and 4:00AM to 8:00AM. At 202, VLR B passes the registration information and inconvenient time period information to mobile subscriber unit B's HLR, HLR B. VLR B also sends its local time information, which may be included with the registration information or may be sent as a separate message to HLR B. VLR B's local time information may include a local time at VLR B, such as, for example, 3:30AM.

At 203, mobile subscriber unit A initiates a call to mobile subscriber unit B. The call request is received by mobile subscriber unit A's HLR, HLR A, which, at 204, passes the call request to HLR B.

In an alternate embodiment, the inconvenient time period information may have been previously stored on a mobile subscriber unit basis in mobile subscriber unit B's HLR, HLR B, thus, eliminating the need for mobile subscriber unit B and VLR B to send this information to HLR B. Thus, each mobile subscriber unit may have different pre-stored inconvenient time information stored at a corresponding HLR.

Because mobile subscriber unit B registered with VLR B, HLR B now has information indicating that mobile subscriber unit B is roaming and has information regarding mobile subscriber unit B's current local time zone and inconvenient time period. If the call request from mobile subscriber unit A occurs at an inconvenient time for mobile subscriber unit B, then, at 205, HLR B sends an indication through HLR A and then, at 206, to mobile subscriber unit A indicating that the call request is occurring during an inconvenient time for a mobile subscriber unit B. The indication may contain a query asking a user at the mobile subscriber unit A whether the call is an emergency. At 207 the user responds "Y" if this is an emergency or "N" if this is not an emergency. At 208, the response is passed through HLR A and HLR B. If the user of the mobile subscriber unit A responds "N" then the call is terminated. If the user at mobile subscriber unit A responds "Y" then the call is allowed to proceed and the call request, at 209, is sent from HLR B to VLR B. VLR B, at 210 then sends the call request to mobile subscriber unit B.

Figure 3:
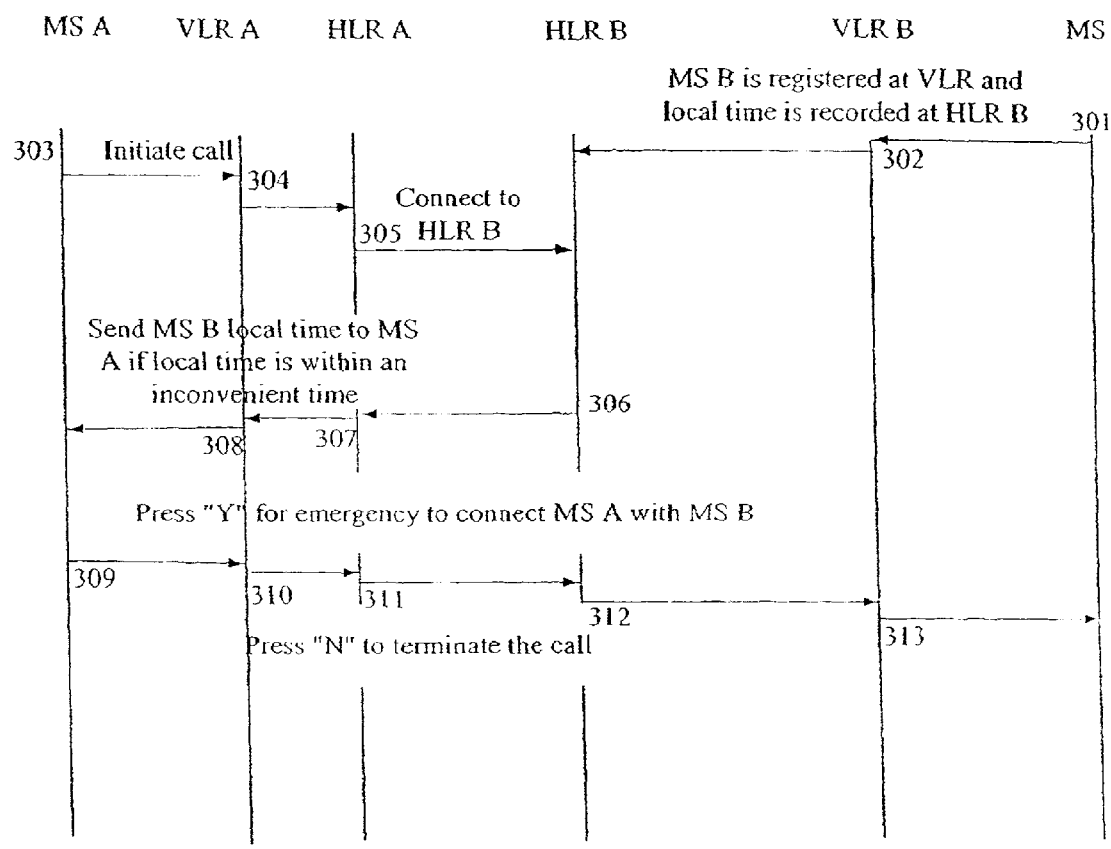

FIG. 3 is a sequence chart which explains the sequence of events when the mobile subscriber unit A is also roaming. 301 and 302 are identical to 201 and 202 of FIG. 2. At 303, the mobile subscriber unit A initiates a call to mobile subscriber unit B; however, the mobile subscriber unit A is roaming and the call request is received by a visitor location register, VLR A.

VLR A, at 304, then passes the call request to mobile subscriber unit A's HLR, HLR A. HLR A then passes the call request to mobile subscriber unit B's HLR, HLR B, at 305.

HLR B, having the local time information of VLR B and mobile subscriber unit B's inconvenient time information, determines whether the call request is occurring at the inconvenient period. If the call is occurring at the inconvenient time, at 306, HLR B sends an indication to mobile subscriber unit A via HLR A. At 307, HLR A sends the indication to VLR A and at 308, VLR A sends the indication to the mobile subscriber unit A and requests the user at mobile subscriber unit A to indicate whether or not the call is an emergency call.

At 309, the mobile subscriber unit A responds either with a "Y" for an emergency call or a "N" if not an emergency call. The response is received by VLR A and at 310 is passed to HLR A.

At 311, HLR A passes the response to mobile subscriber unit B's HLR, HLR B. If the response was "N" the call is terminated. Otherwise, the call is allowed to complete and the call request is forwarded from HLR B to VLR B, at 312 and VLR B forwards the call request to mobile subscriber unit B, at 313.

FIG. 4 shows an example of an indication that may be displayed on a display of the mobile subscriber unit A in an embodiment of the invention. The display may indicate the local time of the called party and ask the user of mobile subscriber unit A to respond either with a "Y" or "N" to the question, "Is this an emergency?"

Figure 5:
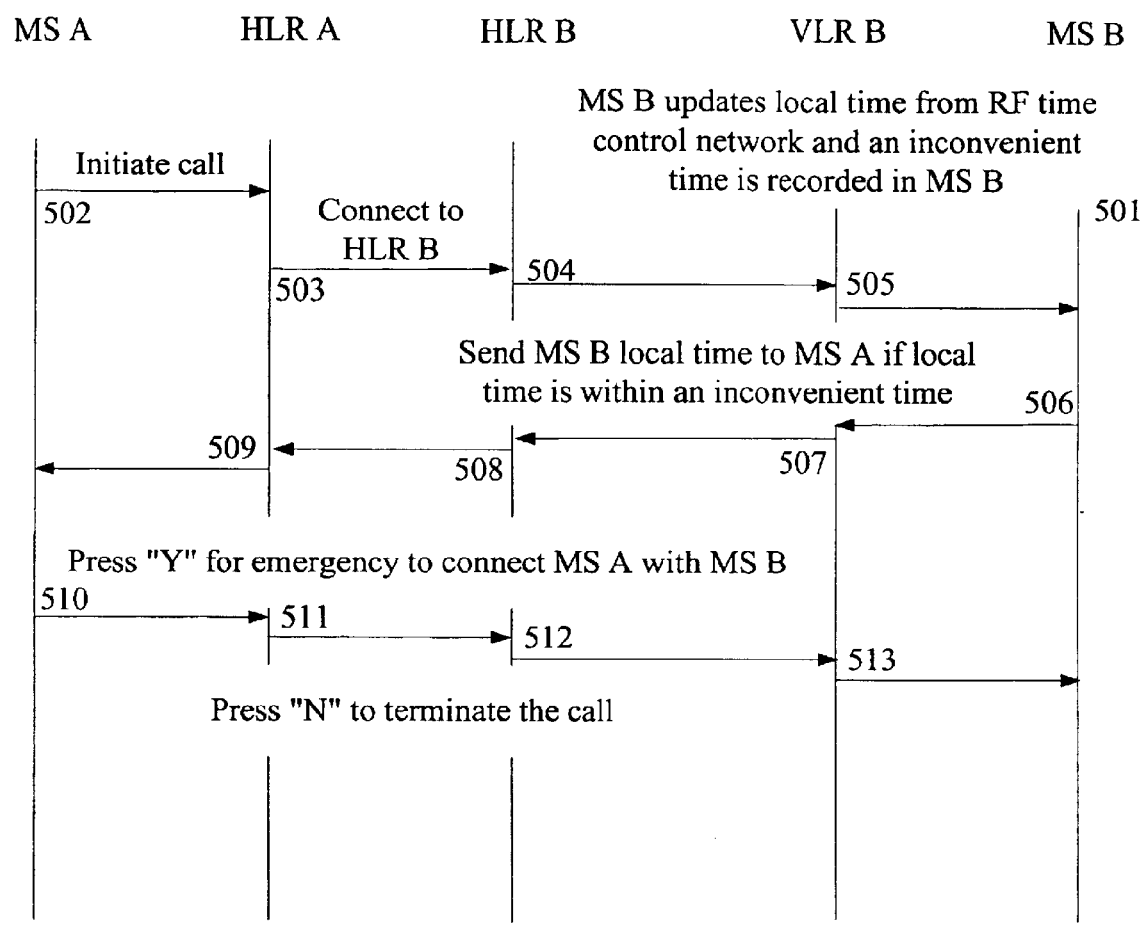
FIGS. 5 and 6 are sequence charts which explain incoming call filtering in a second embodiment of the invention.

FIG. 5 is a sequence chart illustrating a second embodiment of the invention. In this embodiment, the called mobile subscriber unit, rather than the called mobile subscriber unit's HLR, performs the call filtering.

At 501, the mobile subscriber unit B receives time signals from an RF time control network. The local time information, based on the RF time control signals is recorded in a memory in the mobile subscriber unit B. Also, previously recorded at the mobile subscriber unit B is an inconvenient time, or a time at which mobile subscriber unit B does not want to receive phone calls.

At 502, the mobile subscriber unit A initiates a call to the mobile subscriber unit B.

The call request is received at the mobile subscriber unit A's HLR, HLR A and at 503, the call request is passed from HLR A to the mobile subscriber unit B's HLR, HLR B.

At 504, HLR B passes the call request to VLR B, associated with the mobile subscriber unit B.

At 505, the VLR B passes the call request to the mobile subscriber unit B.

At 506, the mobile subscriber unit B determines whether the call request is being received at an inconvenient time, and if so, sends an indication to mobile subscriber unit A, via VLR B.

At 507, VLR B passes the indication to HLR B and at 508, HLR B passes the indication to the mobile subscriber unit A's HLR, HLR A.

At 509 the indication is then passed to the mobile subscriber unit A. The indication may contain a query, as before, requesting a user of the mobile subscriber unit A to respond "Y" if this is an emergency call or "N" if this is not an emergency call. The response is passed through HLR A, HLR B and VLR B to mobile subscriber unit B, at 510, 511, 512, and 513 respectively. If the response is "Y" then the call is established. If the response is "N" then the call is terminated.

Figure 6:
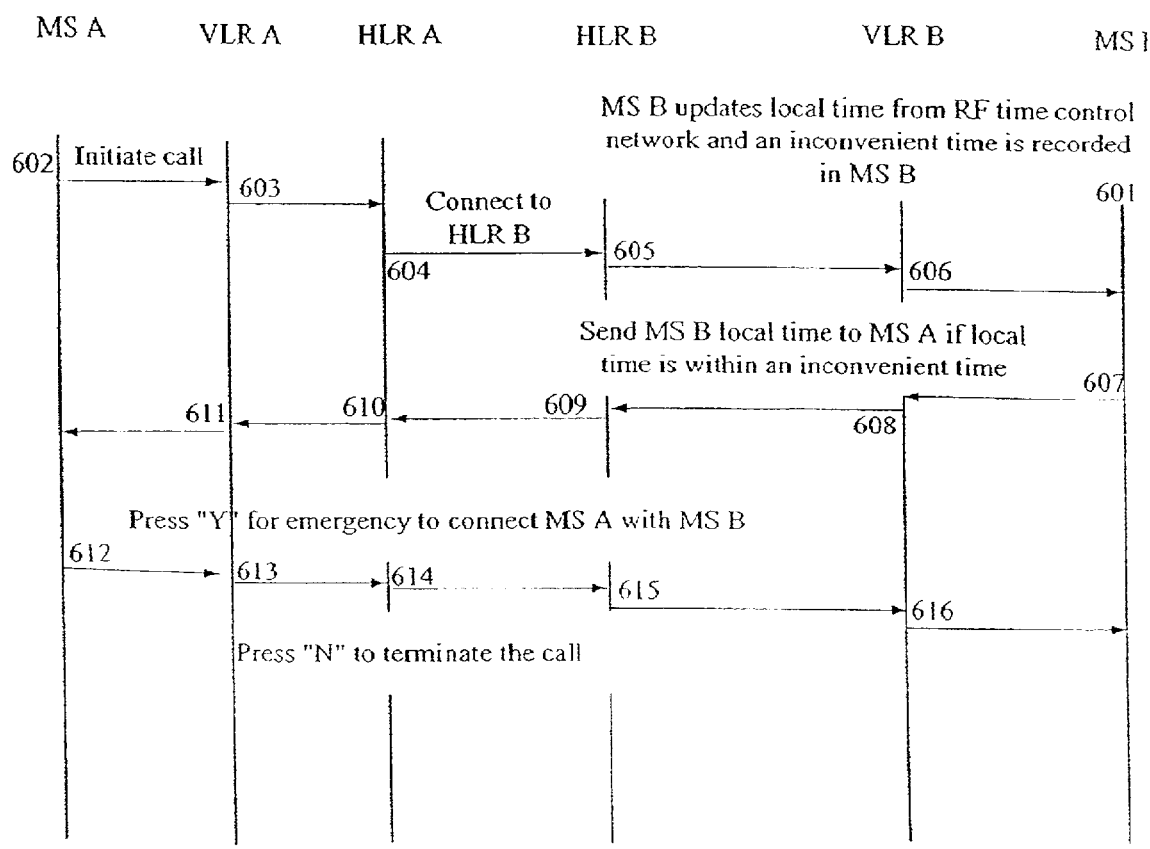

FIG. 6 is a sequence chart explaining a sequence of events in the same embodiment as described in FIG. 5, but in this particular case, the mobile subscriber unit A is a roaming mobile subscriber. The actions at 601 are identical to 501 from FIG. 5.

At 602, the mobile subscriber unit A initiates a call to the mobile subscriber unit B.

The call request is received at the mobile subscriber unit A's VLR, VLR A, and at 603, the call request is passed from VLR A to the mobile subscriber unit A's HLR, HLR A.

At 604, HLR A passes the call request message to an HLR associated with mobile subscriber unit B, HLR B.

At 605, HLR B passes the call request to VLR B, associated with mobile subscriber unit B.

At 606, VLR B forwards the call request to the mobile subscriber unit B.

If mobile subscriber unit B determines that the call request is being received at an inconvenient time, then the mobile subscriber unit B sends an indication to the mobile subscriber unit A indicating that the call is being received at the inconvenient time and asking the user of the mobile subscriber unit A whether the call is an emergency. The indication is sent from the mobile subscriber unit B through VLR B, HLR B, HLR A, VLR A to mobile subscriber unit A, via 607, 608, 609, 610, and 611, respectively.

At 612, the user at the mobile subscriber unit A either responds with a "Y" or a "N" and the response is passed to the mobile subscriber unit B via VLR A, HLR A, HLR B and VLR B, at 613, 614, 615, and 616, respectively. If the response is a "Y", the call is set up at the mobile subscriber unit B, otherwise the call is terminated.

In an alternative embodiment, mobile subscriber unit B's local time information and inconvenient time information can be stored in HLR B. In this case, HLR B can notify the calling mobile subscriber unit, mobile subscriber unit A, when the call is being made during the inconvenient time without first passing the call request to VLR B and mobile subscriber unit B.

Figure 7A:
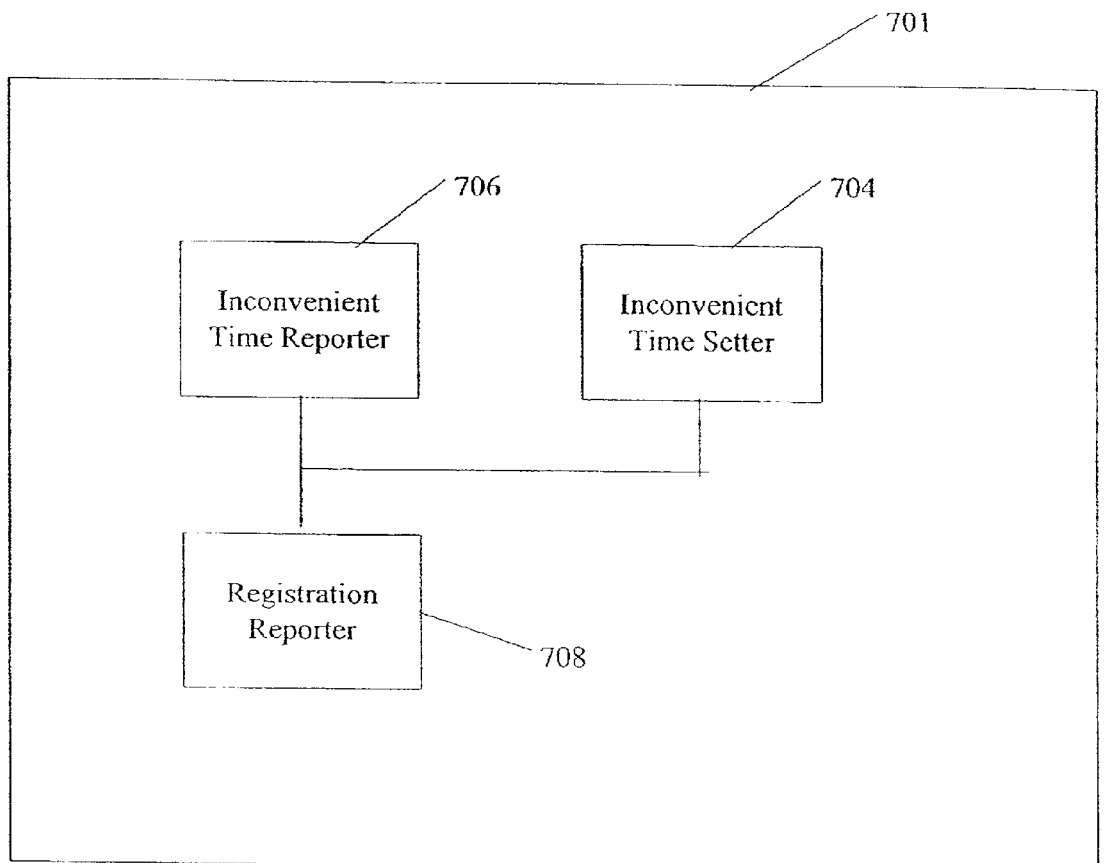
FIG. 7A illustrates a functional block diagram of a called mobile subscriber unit in the first embodiment of the invention.

FIG. 7A is a functional block diagram of the called mobile subscriber unit 701, in the first embodiment of the invention.

Figure 7B:
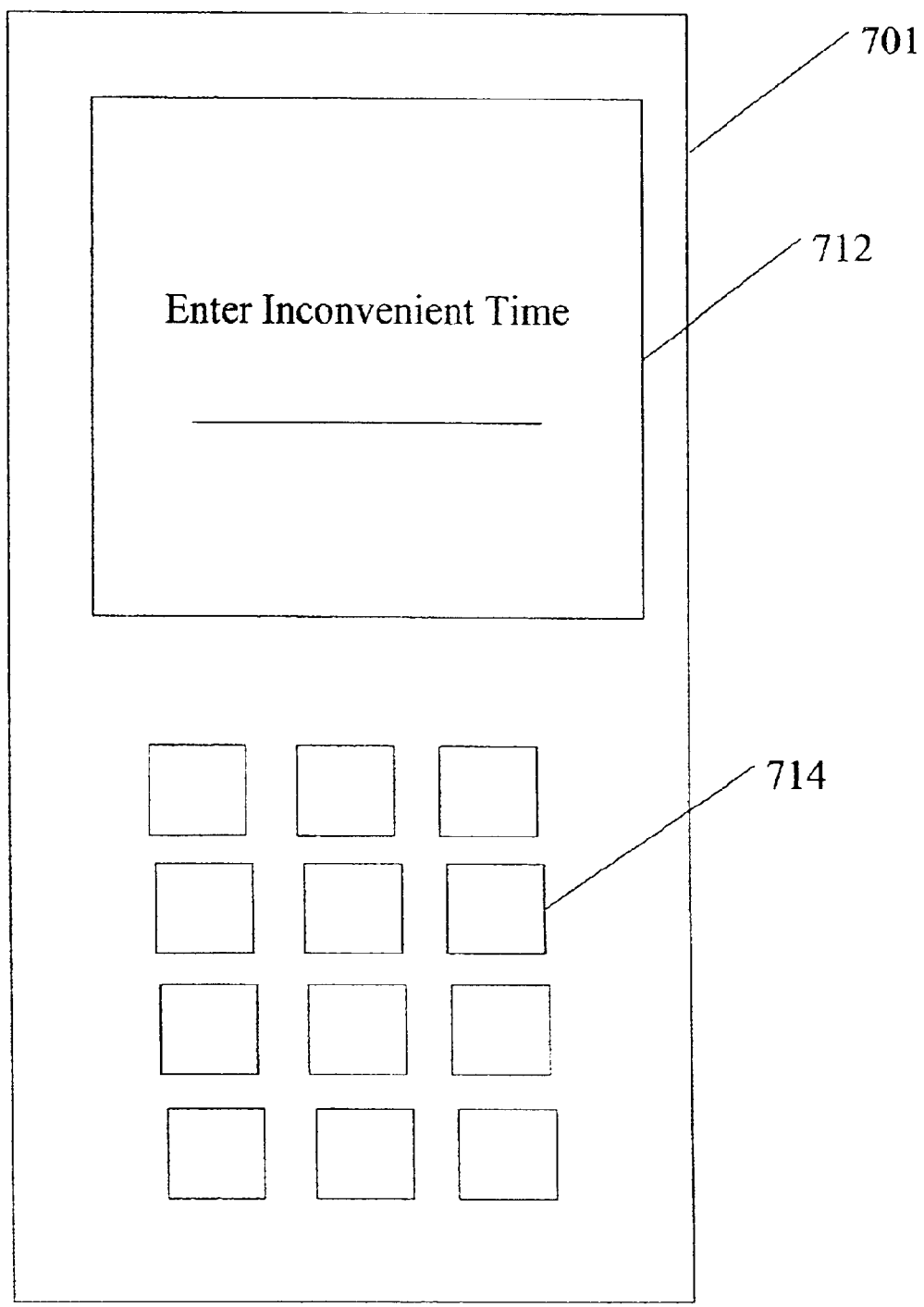
FIG. 7B illustrates a called mobile subscriber unit.

A user of the mobile subscriber unit may set an inconvenient time period via inconvenient time setter 704. This may be performed via an inconvenient time setting menu displayed on a display device (See 712 of FIG. 7B) of the called mobile subscriber unit. Data may be entered by a user via a keypad 714 of the called mobile subscriber unit. The inconvenient time information may be entered as a time range, such as, for example, 12:00AM to 8:00AM, or may be entered as an end time, such as, for example, 08:00AM, with a default starting time of 12:00AM.

Inconvenient time reporter 706 reports the inconvenient time to registration reporter 708. Registration reporter 708 may report the inconvenient time period in a registration message or it may include the inconvenient time period in a message separate from the registration message.

In some embodiments, the inconvenient time period is not reported via a registration reporter, instead, the called unit performs an inconvenient time period check locally in the unit.

Note that in an alternate embodiment, the inconvenient time information may be previously recorded in HLR B, the called mobile subscriber unit's HLR. In such a case, the called mobile subscriber unit would not require an inconvenient timer setter and an inconvenient time reporter.

Figure 8:
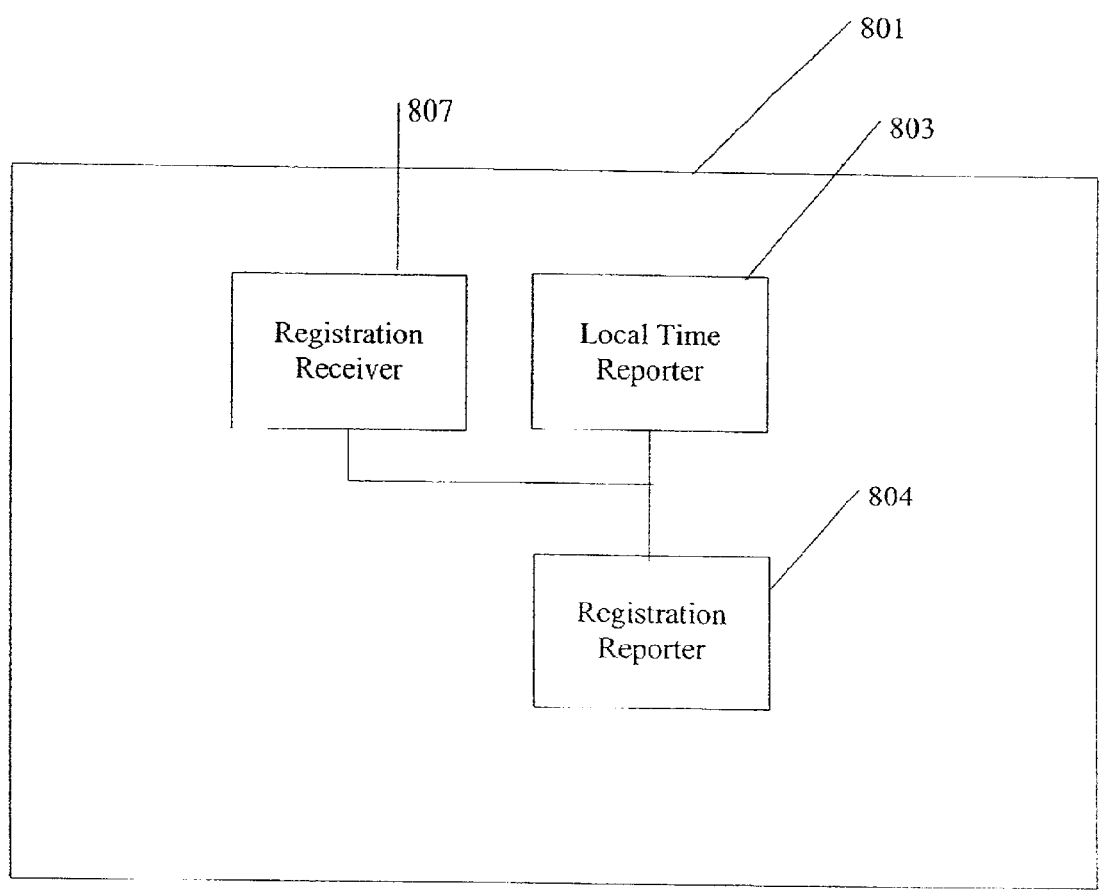
FIG. 8 illustrates a functional block diagram of a Mobile Switching Center/Visitor Location Register (VLR) in the first embodiment of the invention.

FIG. 8 is a functional block diagram of a VLR 801.

VLR 801 receives registration information and inconvenient time information from a roaming mobile subscriber unit into registration receiver 807. Local time reporter 803 passes local time information, corresponding to the time experienced by mobile units operating within range of VLR 801, to registration reporter 804. Registration reporter 804 reports registration information, local time information and inconvenient time information to an HLR associated with the roaming mobile subscriber.

In the alternate embodiment described above, in which inconvenient time information may be pre-stored in the roaming mobile subscriber unit's HLR, inconvenient time information would not be received by the VLR from the roaming mobile subscriber unit.

Figure 9:
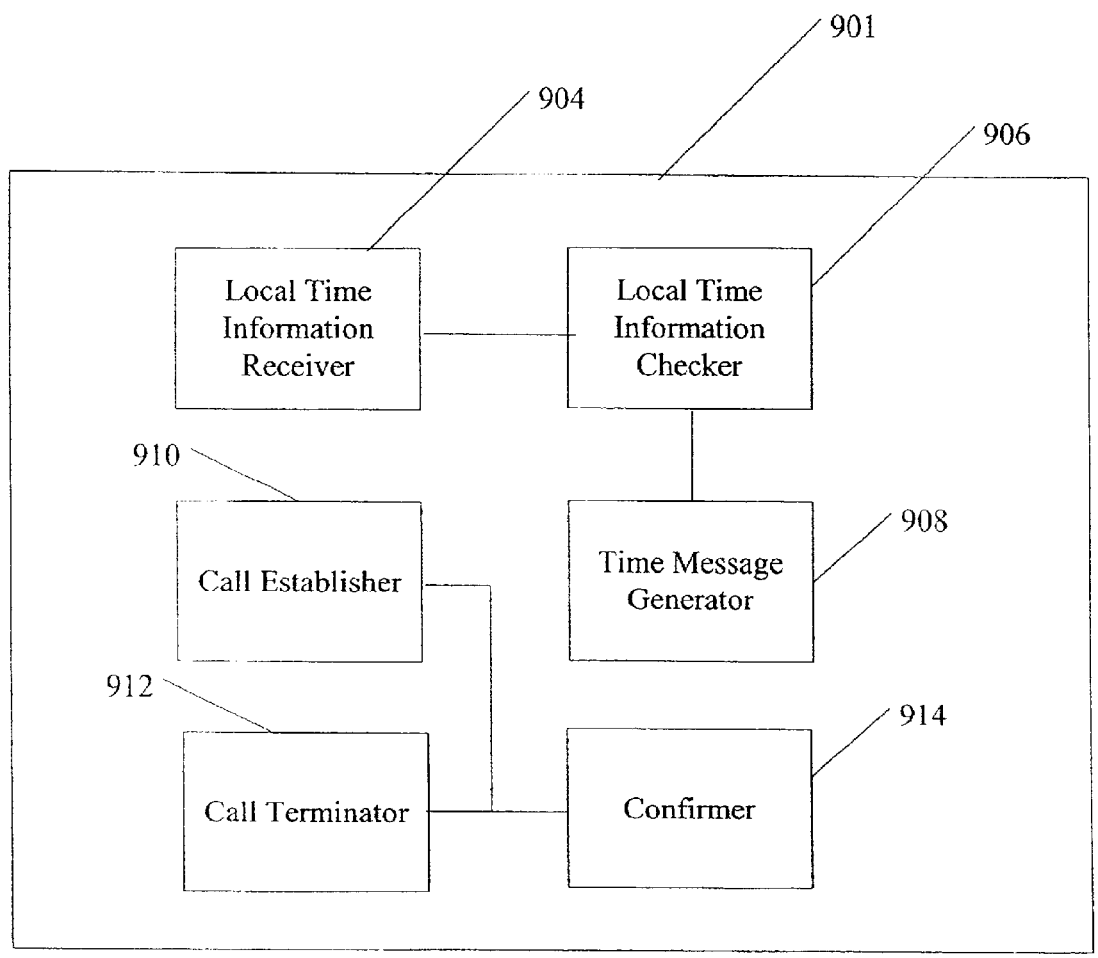
FIG. 9 provides an illustration of a functional block diagram of a Mobile Switching Center/Home Location Register (HLR) in the first embodiment of the invention.

FIG. 9 is a functional block diagram of an HLR in the first embodiment of the invention. The local time information is received into a local time information receiver 904 of an HLR associated with a roaming called mobile subscriber unit when the roaming mobile subscriber unit registers. Inconvenient time information may also be received by the local time information receiver 904 or may be pre-stored in the HLR, for example, the inconvenient time may be pre-stored in a database accessible by the HLR.

When the HLR receives a call request from the calling mobile subscriber unit for the roaming mobile subscriber unit, the HLR checks, via local time information checker 906, the local time information which was previously received from the roaming mobile subscriber unit's VLR and compares the local time information with the inconvenient time information. If the call request occurred at an inconvenient time, time message generator 908 generates a message, which is to be sent to the calling mobile subscriber unit. The message may indicate the called mobile subscriber unit's local time information and may request a user of the calling mobile subscriber unit to indicate whether the call request is or is not an emergency call.

Confirmer 914 analyzes the response from the calling mobile subscriber unit, and if the user calling mobile subscriber unit indicates that the call is an emergency, call establisher 910 will allow the call to be established. Otherwise, call terminator 912 will terminate the call.

Figure 10:
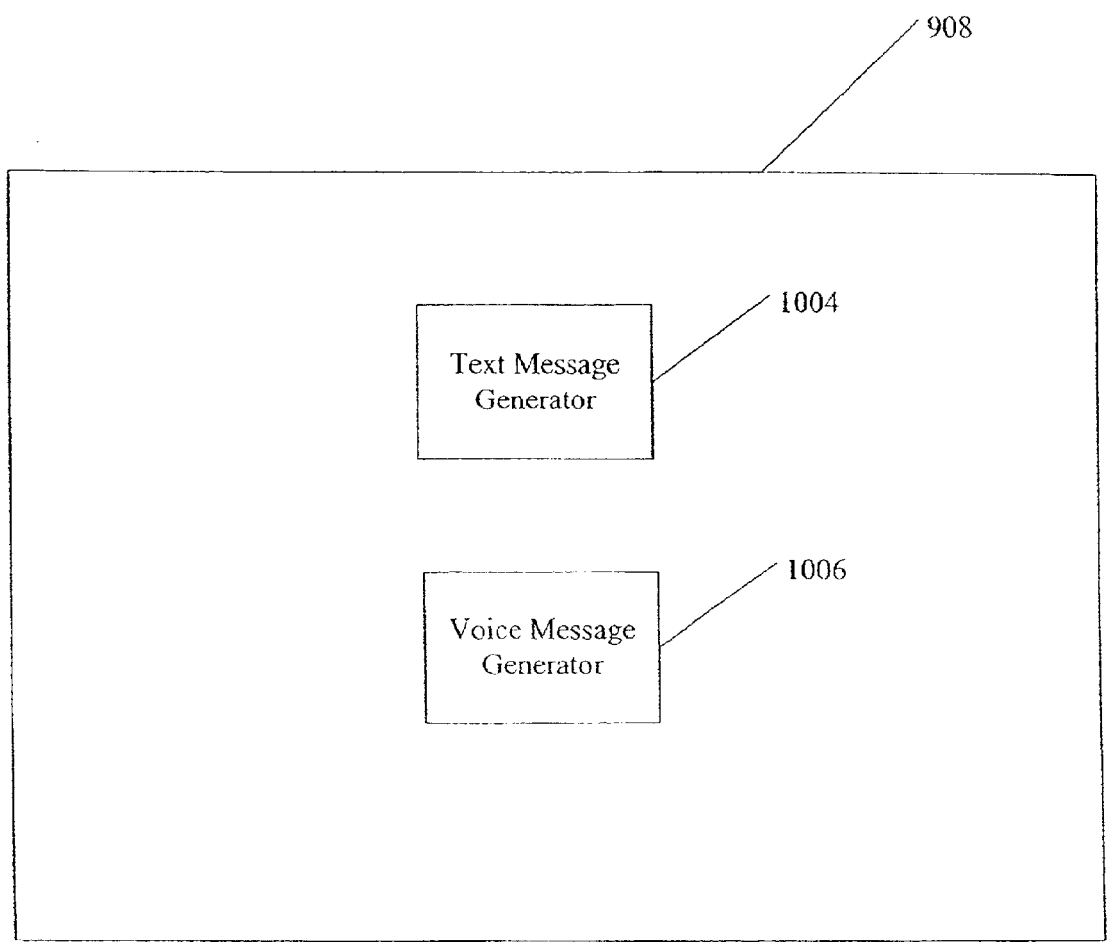
FIG. 10 provides a functional block diagram of a time message generator shown in FIG. 9.

FIG. 10 is a functional block diagram of time message generator 908 shown in FIG. 9. Time message generator 908 includes text message generator 1004 to generate a message to be displayed on the calling mobile subscriber unit display. The displayed message may be as shown in FIG. 4, indicating the called mobile subscriber unit's local time and requesting the calling mobile subscriber unit user to indicate whether this is an emergency call.

An optional voice message generator 1006 generates a voice message to the calling mobile subscriber unit. The voice message may verbally indicate the same information as the text message of FIG. 4.

Figure 11:
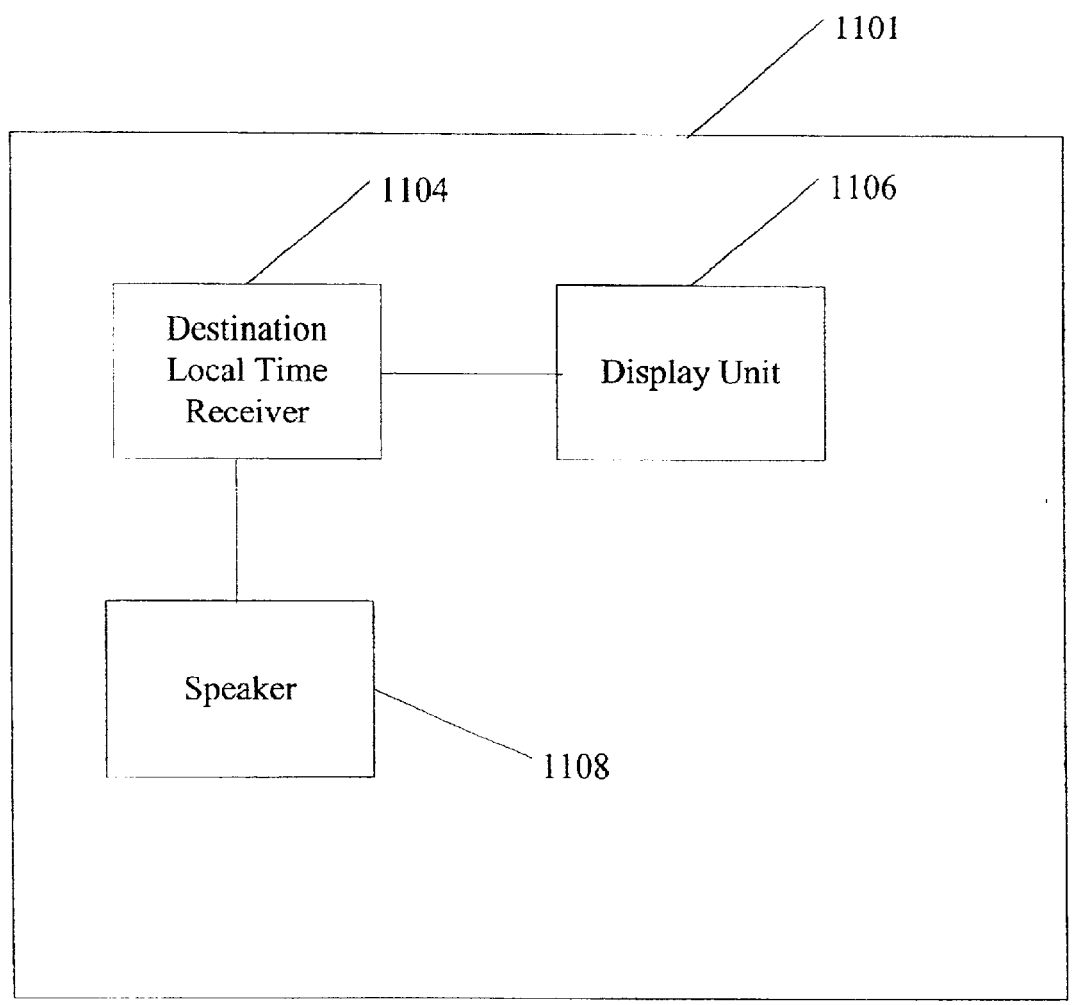
FIG. 11 illustrates a calling mobile subscriber unit in a first embodiment of the invention.

FIG. 11 is a functional block digram of a calling mobile subscriber unit A 1101 in the first embodiment of the invention.

The calling mobile subscriber unit 1101 includes a destination local time receiver 1104, which receives an indication that the call to the called mobile subscriber unit is occurring at an inconvenient time. If the received message is a text message, the text is displayed on display unit 1106. If the message received by the destination local time receiver 1104 is a voice message, the voice message is played over speaker 1108.

Figure 12:
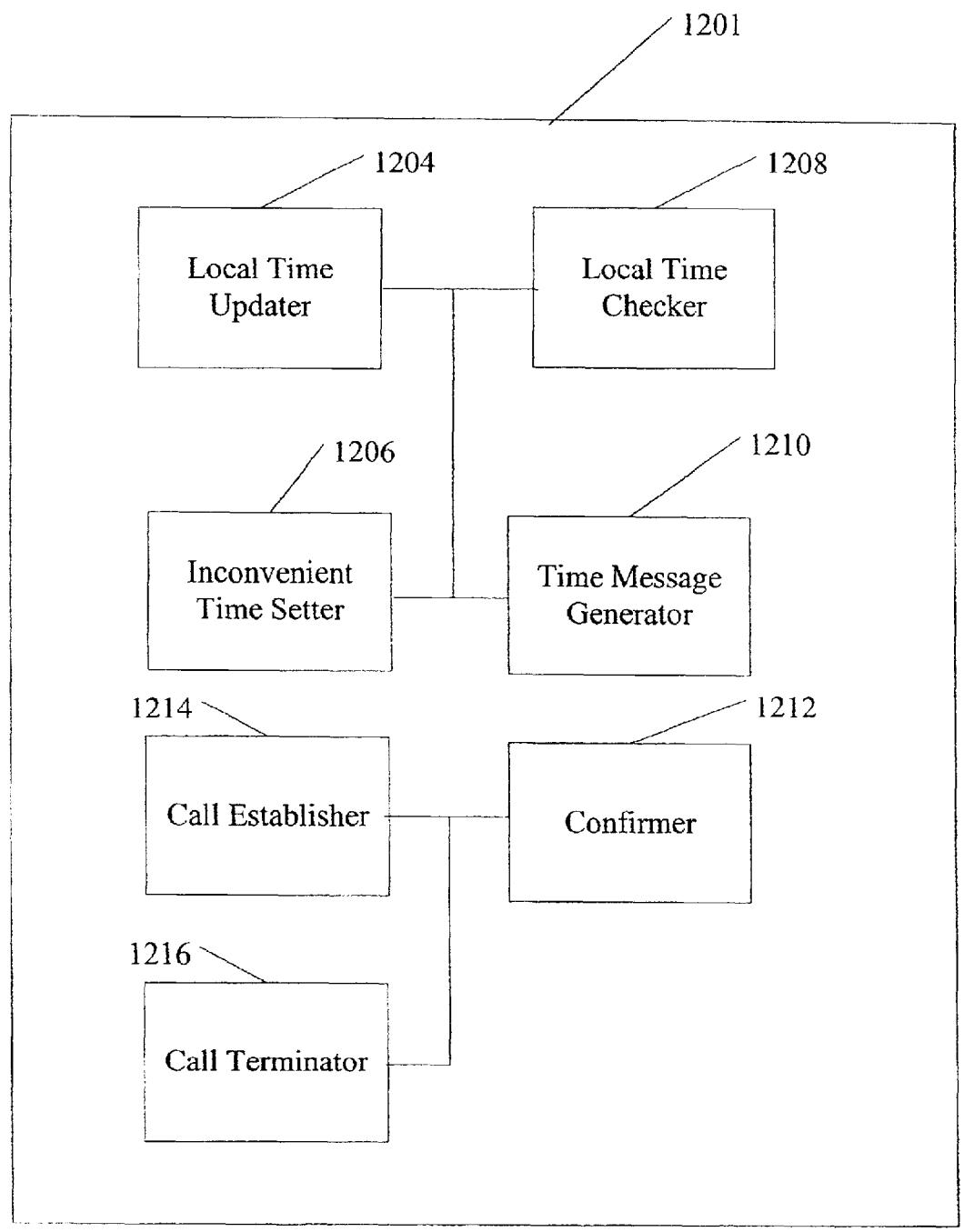
FIG. 12 illustrates the called mobile subscriber unit in the second embodiment of the invention.

FIG. 12 is a functional block diagram of the called mobile subscriber unit 1201 in a second embodiment of the invention.

Local time updater 1204 updates local time information based on received time information over an RF time control channel. Inconvenient time setter 1206 allows a user of the called mobile subscriber unit 1201 to indicate an inconvenient time period. The user may indicate the inconvenient time period via a menu option of the called mobile subscriber unit and by using a keyboard, such as a standard phone pad as previously mentioned regarding the first embodiment.

Local time checker 1208 checks the local time of the called mobile subscriber unit 1201 when a call is received from a calling mobile subscriber unit. If the call request is received at an inconvenient time, time message generator 1210 generates at least one of a text message and a voice message to the calling mobile subscriber unit. The message may indicate the called mobile subscriber unit's local time and may request the calling mobile subscriber unit user to confirm whether the call is an emergency call.

Confirmer 1212 receives a response from the calling mobile subscriber unit and call establisher 1214 allows the call to be established, if the calling mobile subscriber unit user confirms that the call is an emergency. Otherwise, call terminator 1216 terminates the call.

Figure 13:
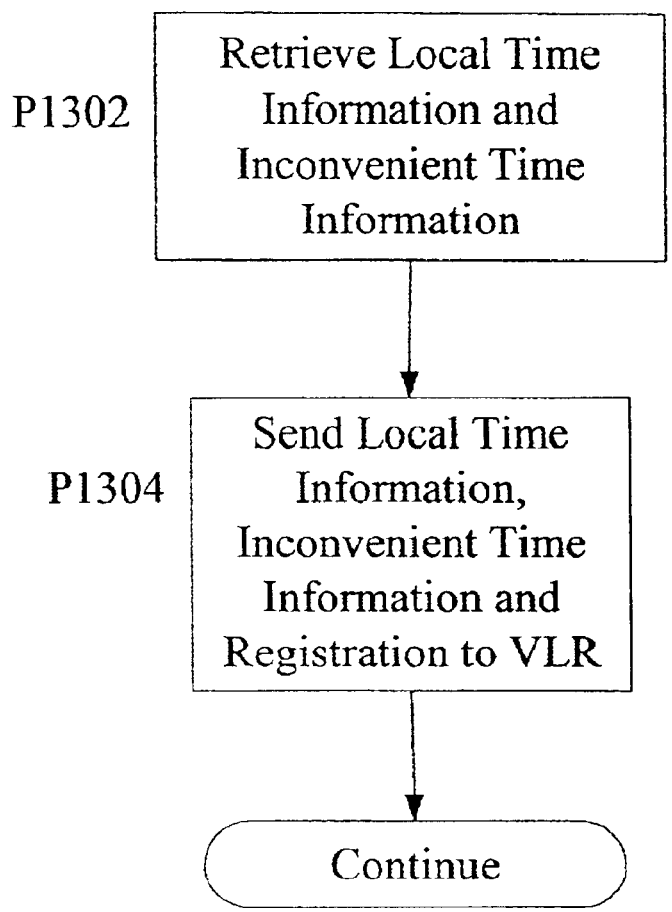
FIG. 13 is a flow chart showing processing in the called mobile subscriber unit in the first embodiment of the invention.

FIG. 13 is a flowchart which explains processing in a roaming called mobile subscriber unit in the first embodiment of the invention.

At P1302 the roaming called mobile subscriber unit retrieves local time information and inconvenient time information, which may be stored in a memory of the roaming called mobile subscriber unit.

At P1304, the local time information, the inconvenient time information and registration information is sent to a VLR. Then normal processing continues.

FIG. 14 is a flowchart which explains processing in a VLR, in the first embodiment of the invention. The VLR is assumed to be associated with a roaming mobile subscriber unit.

At P1402, registration information local time information, and inconvenient time information is received from the roaming mobile subscriber unit.

At P1404, the registration information, the inconvenient time information and local time information of the VLR is passed to an HLR associated with the roaming mobile subscriber unit. Then normal processing continues.

Figure 15A:
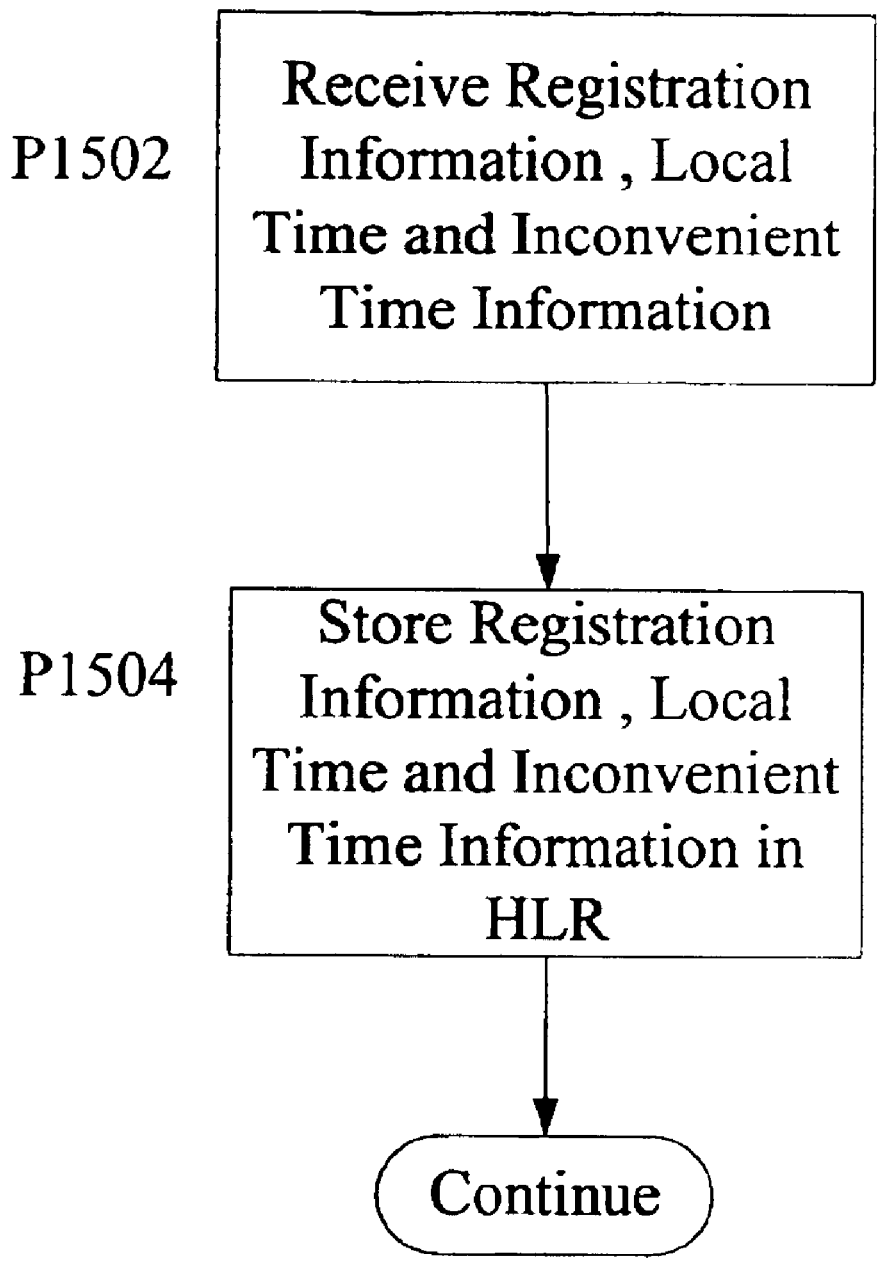
FIGS. 15A–15C are flow charts, which explain processing in the HLR in the first embodiment of the invention.
Figure 15B:
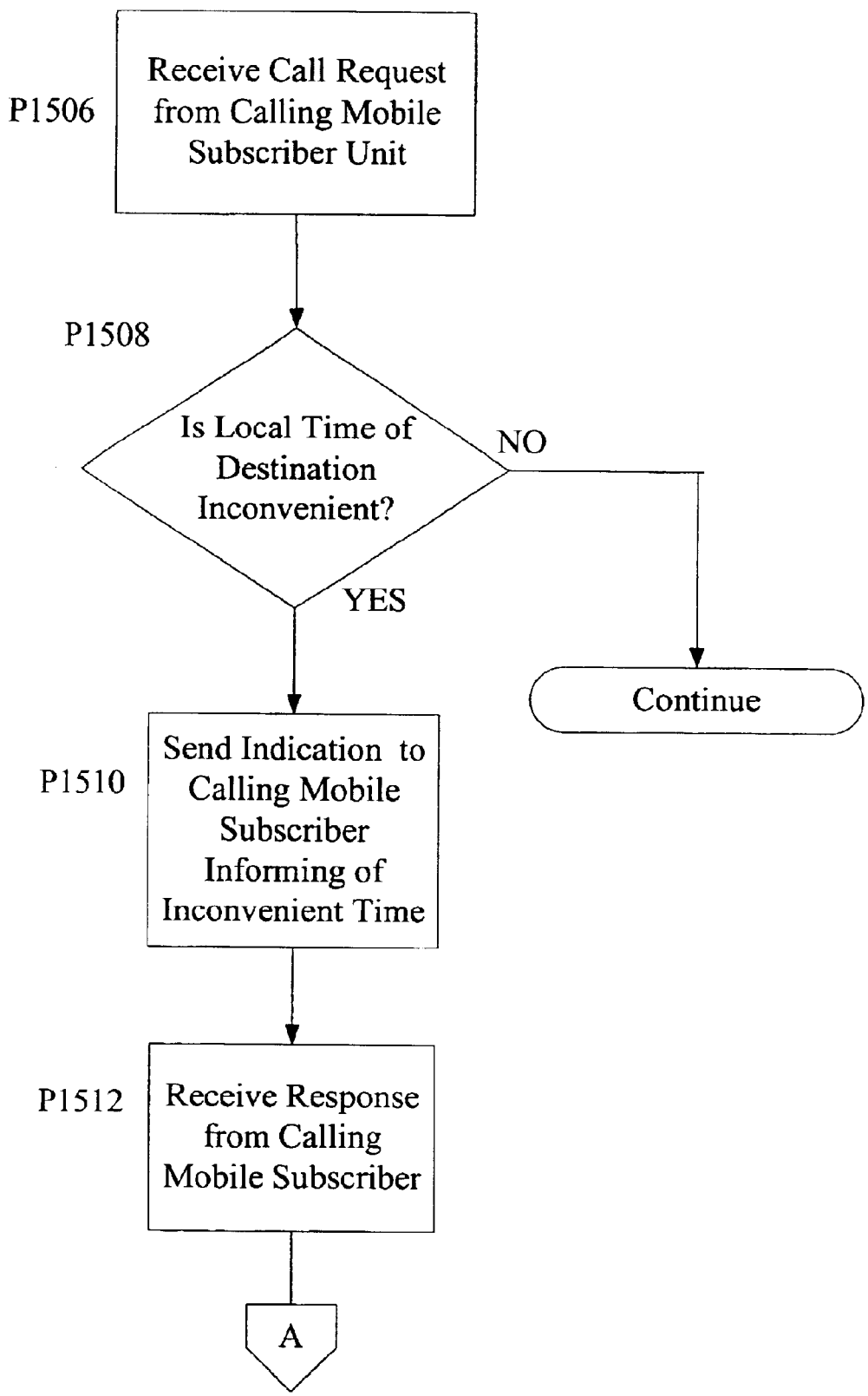
Figure 15C:
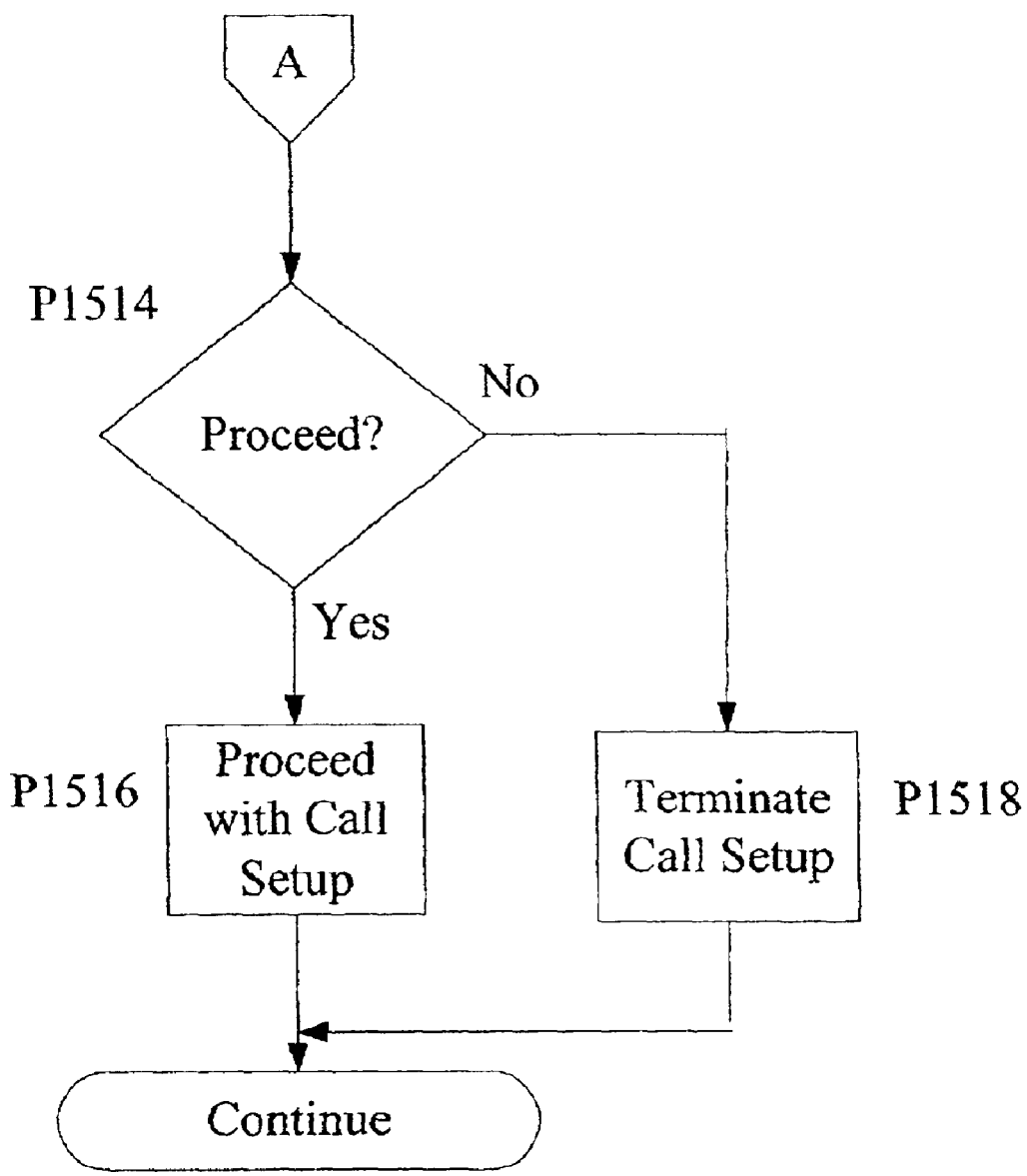

FIGS. 15A–15C are flowcharts which explain processing in an HLR, in the first embodiment of the invention. The HLR is assumed to be associated with the roaming mobile subscriber unit.

At P1502 registration information, local time information, and inconvenient time information from the VLR associated with the called mobile subscriber unit is received. Alternatively, inconvenient time information may be pre-stored in, for example, a database of the HLR eliminating the need for the HLR to received this information from the VLR.

At P1504 the registration information, local time information, and inconvenient time information (if not pre-stored) are stored at the HLR. Then normal processing continues.

Sometime later, at P1506, a call request is received from the calling mobile subscriber unit for the roaming called mobile subscriber unit associated with the HLR.

At P1508 a check is made to determine whether the local time of the called mobile subscriber unit is in an inconvenient time period. If it is not, then the call will be allowed to be established and processing will be allowed to be continued.

If the local time of the called mobile subscriber unit is during an inconvenient time period, then, optionally at P1510, an indication will be sent to the calling mobile subscriber unit, informing the calling mobile subscriber unit of the inconvenient time period. The indication may be a text message to be displayed on a display of the calling mobile describer unit or a voice message to be played over a speaker to a user of the calling mobile subscriber unit indicating, for example, the called mobile subscriber's unit local time. Both the text and the voice messages may request the user to indicate whether or not the call is an emergency call.

At P1512, a response is received from the calling mobile subscriber unit indicating whether the call is an emergency call.

At P1514, a determination is made whether the call should proceed (emergency call). If the call should proceed, call setup continues at P1516, otherwise, the call termination occurs at P1518.

In an alternate embodiment, if the check at P1508 indicates that the local time of the destination is in the inconvenient time period, then P1518 is performed to terminate the call.

Figure 16:
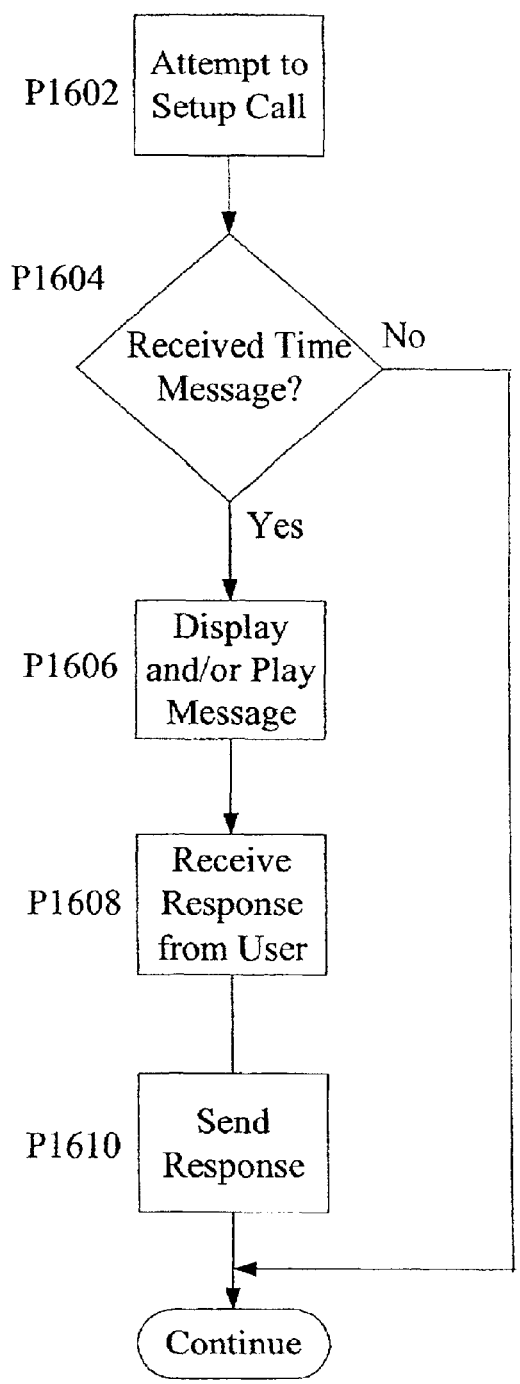
FIG. 16 is a flow chart, which explains processing in the calling mobile subscriber unit in the first embodiment of the invention.

FIG. 16 is a flowchart, which illustrates processing in a calling mobile subscriber unit in the first and the second embodiment of the invention.

At P1602, the calling mobile subscriber unit attempts to set up a call to a roaming mobile subscribing unit.

At P1604 a check is made to determine whether a time message indication was received regarding the called mobile subscriber unit. If not, then the call continues as normal, otherwise, the message is displayed, if it is a text message, or played to a user of the calling mobile subscriber unit, if it is a voice message, at P1606. The message requests the user of the calling mobile subscriber unit to indicate whether or not the call is an emergency call.

At P1608, a response indicating whether the call is an emergency is received from the user of the calling mobile subscriber unit.

At P1610, the response is sent.

Figure 17A:
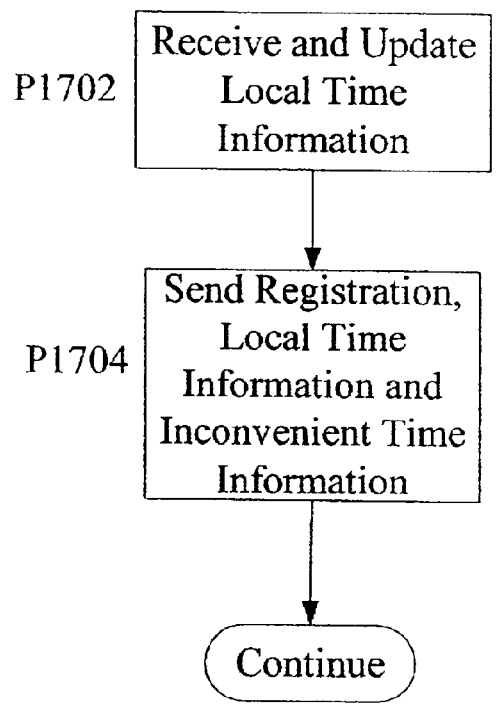
FIGS. 17A–17C are flow charts, which explain processing in the called mobile subscriber unit in the second embodiment of the invention.
Figure 17B:
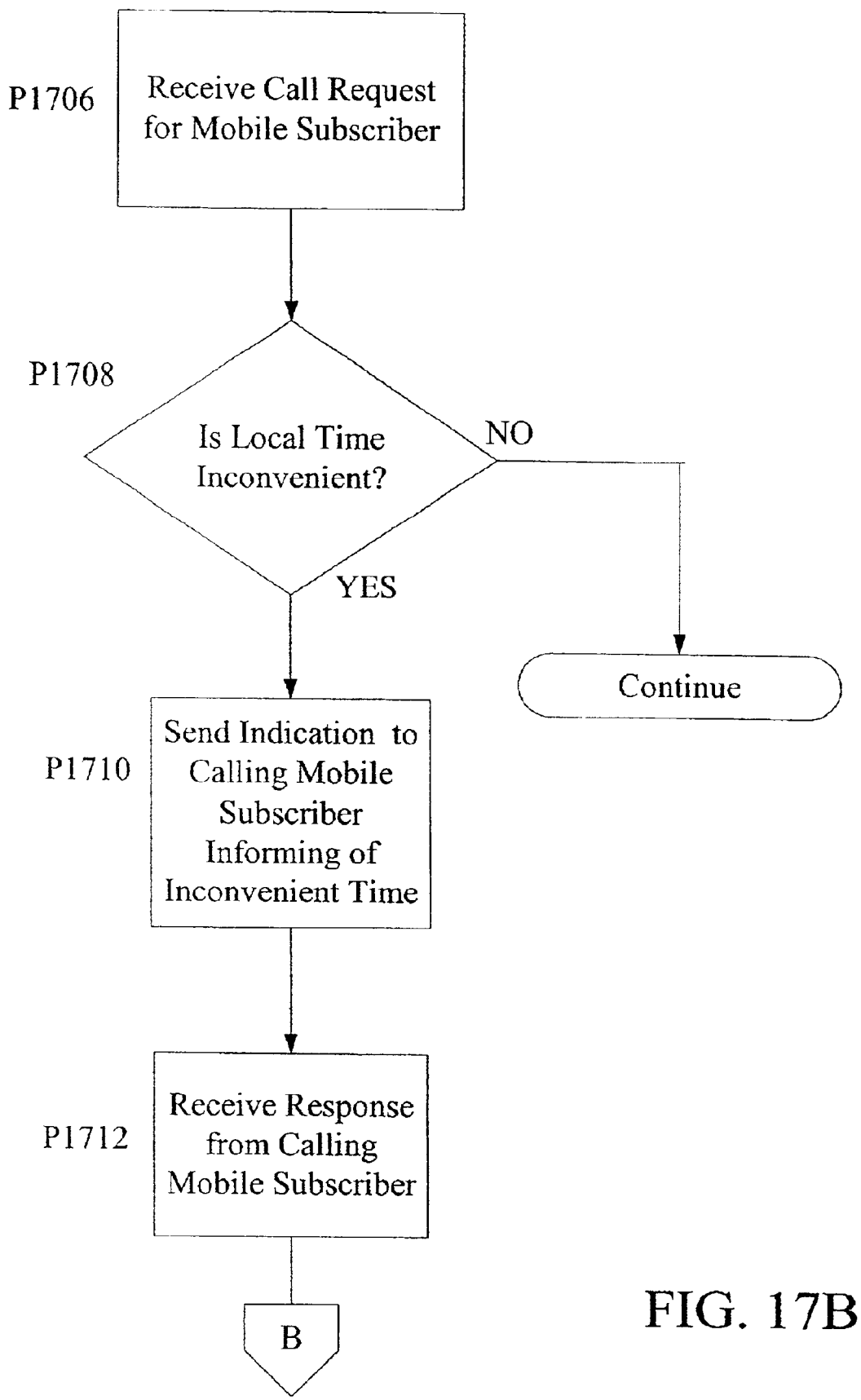
Figure 17C:
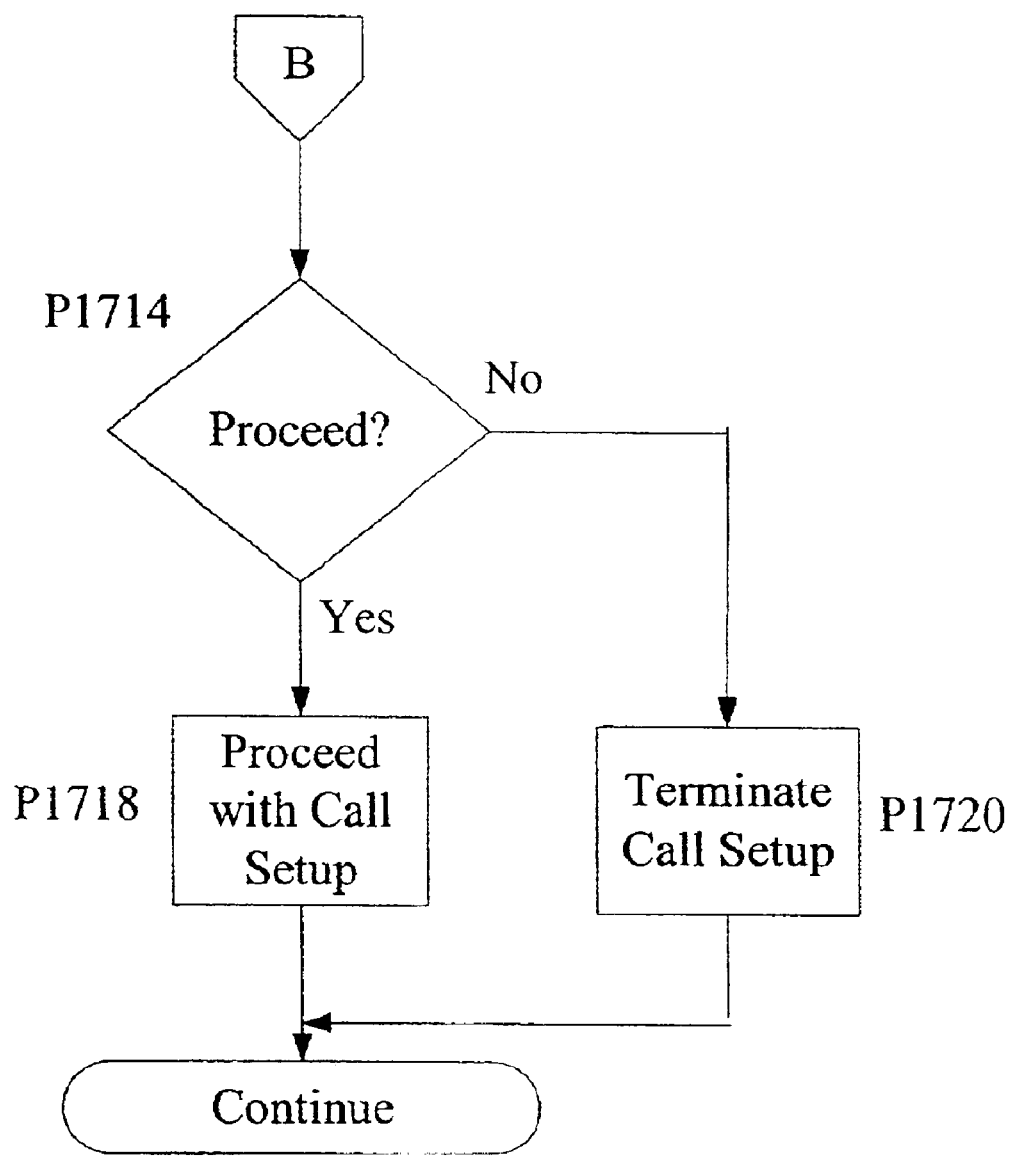

FIGS. 17A–17C are flowcharts, which explain processing in a called mobile subscriber unit in the second embodiment of the invention.

At P1702, local time information is received over an RF control channel and the local time information is updated in a memory of the called mobile subscriber unit. Alternatively, the user may in some embodiments manually enter a local time.

At P1704, registration information to allow the roaming called mobile subscriber to receive calls, local time information, and previously set inconvenient time information is sent to a VLR. Normal processing then continues.

Sometime later, at P1706, the called mobile subscriber unit receives a call request from the calling mobile subscriber unit.

At P1708, the called mobile subscriber unit determines whether the local time is in an inconvenient time period. If it is not, processing continues as normal. If the local time is within an inconvenient time period, at P1710, an indication is sent to the calling mobile subscriber unit informing the user of the calling mobile subscriber unit that the call is occurring at an inconvenient time. A message may be displayed at the calling mobile subscriber unit, as indicated in FIG. 4, or a voice message may be played over a speaker at the calling mobile subscriber unit with the same information as provided in the text message as shown in FIG. 4.

At P1712, a response is received from the calling mobile subscriber unit indicating whether or not the call is an emergency call.

At P1714, if the user indicated that the call is an emergency call, P1718 will be performed to set up the call, otherwise, P1720 will be performed to terminate the call. After P1718 or P1720 normal processing continues.

While the invention has been described with reference to certain illustrated embodiments, the words which have been used herein are words of description, rather than words of limitation. Changes may be made within the purview of the appended claims without departing from the scope and spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims. The term "mobile subscriber unit" encompasses cell phones, personal digital assistants (PDAs), or any portable electronic device capable of permitting a user to communicate with another person or entity.

We claim as our invention:

1. A mobile communication system comprising:
    a mobile switching center/visitor location register;
    a first mobile subscriber unit, the first mobile subscriber unit including a time reporter to report local time information to the mobile switching center/visitor location register when the first mobile subscriber unit is roaming;
    a first mobile switching center/home location register associated with the first mobile subscriber unit and configured to receive the local time information from the mobile switching center/visitor location register when the first mobile subscriber unit is roaming; and
    a second mobile subscriber unit including a destination local time receiver to receive the local time information from the first mobile switching center/home location register when the first mobile switching center/home location register determines that a call attempt from the second mobile subscriber unit to the first mobile subscriber unit occurs during a set time period according to the local time information.

2. The mobile communication system of claim 1, wherein: the second mobile subscriber unit includes a display unit to display a notification that a local time of the first mobile subscriber unit is within the set time period when the destination local time receiver receives the local time information.

3. The mobile communication system of claim 2, wherein: when the display unit displays the notification, the display unit further displays a request to a user of the second mobile subscriber unit to perform one of confirming that the call is to be completed and terminating establishment of the call.

4. The mobile communication system of claim 1, wherein: the second mobile subscriber unit further includes means for providing a notification that a local time of the first mobile subscriber unit is within the set time period when the destination local time receiver receives the local time information.

5. The mobile communication system of claim 3, further comprising a call establisher to establish the call when an indication is received from the second mobile subscriber unit confirming that the call is to be established, the indication being sent from the second mobile subscriber unit after the second mobile subscriber unit receives the message indicating that the local time of the first mobile subscriber unit is in the set time period.

6. The mobile communication system of claim 3, further comprising a call terminator to terminate the call when an indication is received from the second mobile subscriber unit indicating that the call is to be terminated, the indication being sent from the second mobile subscriber unit after the second mobile subscriber unit receives the message indicating that the local time of the first mobile subscriber unit is in the set time period.

7. The mobile communication system of claim 1, wherein:
    the first mobile subscriber unit further includes a local time updater to update the local time information based on received time indications, and
    the first mobile switching center/home location register further includes:
        a local time checker to check the updated local time information when the call attempt is received; and
        a time message generator to generate and send a message to the second mobile subscriber unit when the local time checker determines that a local time of the first mobile subscriber unit is within the set time period based on the updated local time information.

8. The mobile communication system of claim 7, wherein the message to be generated by the time message generator includes a request for the second mobile subscriber unit to perform one of confirming that the call is to be established and terminating establishment of the call.

9. The mobile communication system of claim 7, wherein the first mobile subscriber unit further comprises a time setter to allow a user of the first mobile subscriber unit to specify the set time period.

10. The mobile communication system of claim 7, wherein the message includes a voice message to be played on a speaker of the second mobile subscriber unit.

11. The mobile communication system of claim 1, wherein:
    the first mobile subscriber unit further includes:
        a local time updater to update the local time information based on received time indications;
        a local time checker to check the updated local time information when the call attempt is received; and
        a time message generator to generate and send a message to the second mobile subscriber unit when the local time checker determines that a local time of the first mobile subscriber unit is within the set time period based on the updated local time information.

12. The mobile communication system of claim 11, wherein the message to be generated by the time message generator includes a request for the second mobile subscriber unit to perform one of confirming that the call is to be established and terminating establishment of the call.

13. The mobile communication system of claim 11, wherein the first mobile subscriber unit further comprises a time setter to allow a user of the first mobile subscriber unit to specify the set time period.

14. The mobile communication system of claim 11, wherein the message includes a voice message to be played on a speaker of the second mobile subscriber unit.

15. The mobile communication system of claim 1, wherein the first mobile subscriber unit further comprises a time setter to allow a user of the first mobile subscriber unit to specify the set time period.

16. A mobile communication system comprising:
    a first mobile subscriber unit, the first mobile subscriber unit including a time reporter to report local time information to a mobile switching center/visitor location register when the first mobile subscriber unit is roaming;
    a first mobile switching center/home location register associated with the first mobile subscriber unit and configured to receive the local time information when the first mobile subscriber unit is roaming; and
    a second mobile subscriber unit including a destination local time receiver to receive the local time information from the first mobile switching center/home location register when the first mobile switching center/home location register determines that a call attempt from the second mobile subscriber unit to the first mobile subscriber unit occurs during a set time period according to the local time information.

17. The mobile communication system of claim 16, wherein:
the second mobile subscriber unit includes a display unit to display a notification that a local time of the first mobile subscriber unit is within the set time period when the destination local time receiver receives the local time information.

18. The mobile communication system of claim 17, wherein:
when the display unit displays the notification, the display unit further displays a request to a user of the second mobile subscriber unit to perform one of confirming that the call is to be completed and terminating establishment of the call.

19. The mobile communication system of claim 16, wherein:
the second mobile subscriber unit further includes means for providing a notification that a local time of the first mobile subscriber unit is within the set time period when the destination local time receiver receives the local time information.

20. The mobile communication system of claim 1, wherein the set time period comprises user entered time information.

21. The mobile communication system of claim 1, wherein the set time period comprises a default start time.

22. The mobile communication system of claim 21, wherein the set time period comprises a user entered end time.

23. The mobile communication system of claim 1, wherein the set time period comprises pre-stored time information.

24. The mobile communication system of claim 1, wherein the set time period comprises a preset time range.

25. The mobile communication system of claim 16, wherein the set time period comprises user entered time information.

26. The mobile communication system of claim 16, wherein the set time period comprises a default start time.

27. The mobile communication system of claim 26, wherein the set time period comprises a user entered end time.

28. The mobile communication system of claim 16, wherein the set time period comprises pre-stored time information.

29. The mobile communication system of claim 16, wherein the set time period comprises a preset time range.

* * * * *

UNITED STATES PATENT AND TRADEMARK OFFICE
CERTIFICATE OF CORRECTION

PATENT NO. : 6,934,543 B2
DATED : August 23, 2005
INVENTOR(S) : Shu-shaw Wang et al.

It is certified that error appears in the above-identified patent and that said Letters Patent is hereby corrected as shown below:

<u>Title page,</u>
Item [56], References Cited, U.S. PATENT DOCUMENTS, insert
-- 5,920,614    7/1999    Osman et al --.

Signed and Sealed this

Tenth Day of January, 2006

JON W. DUDAS
*Director of the United States Patent and Trademark Office*